Patented Nov. 7, 1939

2,178,536

UNITED STATES PATENT OFFICE 2,178,536

ANTIOXIDANTS

Albert M. Clifford, Stow, Ohio, assignor to Wingfoot Corporation, Wilmington, Del., a corporation of Delaware No Drawing. Application February 18, 1936, Serial No. 64,499

12 Claims. (Cl. 260—803)

This invention relates to a method of treating rubber. More particularly, it relates to a new class of materials suitable for improving the ageing qualities of rubber, the preparation of these materials, and the use of the same.

The materials of the invention are obtained by the reaction of an aldehyde, a secondary aromatic amine, and an aromatic hydroxy compound.

Many compounds have been suggested for resisting the tendency of rubber and similar materials to deteriorate on ageing. Among these suggested compounds are even some derived by the interaction of aldehydes, amines, and aromatic hydroxy compounds. However, the exact type of material obtained from these ingredients depends upon the specific type of starting materials chosen, the proportions of these ingredients, and the method and order of their interaction.

By the present invention, it has been discovered that excellent age resistors for rubber are obtained by the reaction, in one step, of an aldehyde, a secondary aromatic amine, and an aromatic hydroxy compound.

The following preparations are illustrative of the practice of the invention.

Example A

Seventy-two grams of beta naphthol and 109 grams of phenyl beta naphthylamine were separately dissolved by warming in a total of 400 grams of alcohol. These solutions were mixed and the resultant solution was treated, while still warm, with 42 grams of 36% formaldehyde in water. A few drops of concentrated HCl were then added to initiate the reaction. A resinous product precipitated. After cooling, this was triturated to a fine powder, filtered, washed with water, and dried. The yield was 120 grams.

Example B

A mixture of 36 grams of beta naphthol and 65 grams of N, N'-diphenyl p-phenylene diamine was dissolved by warming in a mixture of 220 grams of alcohol and 70 grams of toluene. To this warm solution were added 21 grams of 36% formaldehyde in water, followed by one gram of concentrated HCl. A vigorous reaction ensued, resulting in the precipitation of a greenish solid product. This solid was triturated to a powder, filtered, washed with water, and dried. The final yield was 75 grams.

It is to be understood that the foregoing examples are illustrative of the invention and not limitative.

For instance, other aldehydes may be employed in place of formaldehyde. Thus, the invention also includes the use of acetaldehyde, propionaldehyde, butyraldehyde, isobutyraldehyde, heptaldehyde, acrylic aldehyde, crotonaldehyde, benzaldehyde, furfuraldehyde, cinnamic aldehyde, 2-hydroxy alpha naphthaldehyde, etc.

Many other secondary aromatic amines may also be used. These include phenyl alpha (or beta) naphthylamine, dinaphthyl amine, diphenylamine, phenyl tolyl amine, ditolyl amine, cumidyl naphthyl amine, diphenyl phenylene diamine, diphenyl naphthalene diamine, ditolyl naphthalene diamine, dinaphthyl p-phenylene diamine, ditolyl phenylene diamine, N-phenyl phenetidine, N-tolyl phenetidine, phenetidyl naphthyl amines, the N-phenyl- and N-tolyl-tetrahydro naphthyl amines, N-N' diphenyl ethylene diamine, N,N' dinaphthyl ethylene diamine, N-cyclohexyl beta naphthylamine, N-butyl beta naphthylamine, etc.

Among the aromatic hydroxy compounds, generally better results are obtained using the naphthalene derivatives, such as alpha naphthol, beta naphthol, naphthohydroquinone, etc., so that these are the preferred compounds. However, efficacious results are also obtained employing phenol, cresols, xylenols, hydroquinone, hydroxy biphenyl, hydroxy diphenyl oxide, etc.

Reasoning from analogy with similar reactions and a knowledge of their mechanism, it is reasonable to suppose that one product formed consists of an equimolecular condensation of the three starting materials to yield, if the ingredients are beta naphthol, phenyl beta naphthylamine, and formaldehyde, a product of the formula

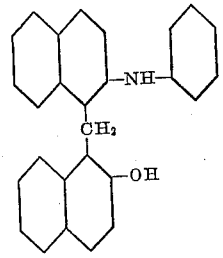

However, the resinous nature of the products obtained demonstrate that they are mixtures of indefinite structure. And, in fact, no pure product of a type of structure similar to the above example has been isolated and established. This kind of product is quite characteristic of this type of reaction. In spite of this indefinite composition, there is ample evidence to show, as has been before pointed out, that these products depend upon the type of starting materials, the proportions of these materials, and the method and order of their interaction.

The present invention includes the reaction in one step and in the presence of an acid catalyst such as HCl, of an aldehyde, a secondary aromatic amine, and an aromatic hydroxy compound.

It is not intended that the proportions of the reactant materials shall be limited. If the aldehyde is present in excess it probably is taken up in a further condensation with the product. Usually, the amine and hydroxy compound will be used in equimolecular proportions. However, this is not a limitation of the invention, since in some cases, it may become desirable to change the equilibrium of the reaction and modify the character of the final product by varying these proportions.

The products of the invention may be employed in most rubber formulae. The following is a specific formula in which they have been found by test to yield excellent results:

| | Parts by weight |
|---|---|
| Extracted rubber | 100.0 |
| Zinc oxide | 5.0 |
| Sulphur | 3.0 |
| Stearic acid | 1.5 |
| Hexamethylene tetramine | 1.0 |
| Age resistor | 1.0 |

Representative materials were incorporated into rubber in accordance with this formula. Samples were cured and tested. The following data include the results on the freshly cured stocks and on samples aged six days in an oxygen bomb at 50° C. and under 150 pounds per square inch pressure.

| Cure in mins., °F. | Before ageing | | | | After ageing | | | | Percent wt. inc. |
|---|---|---|---|---|---|---|---|---|---|
| | Tens. | Elg. | Kgs/cm.² | | Tens. | Elg. | Kgs/cm.² | | |
| | | | 500% | 700% | | | 500% | 700% | |

REACTION PRODUCT OF BETA NAPHTHOL, FORMALDEHYDE AND PHENYL BETA NAPHTHYLAMINE

| 35/285 | 89 | 820 | 16 | 45 | 121 | 835 | 17 | 56 | .05 |
| 50 | 104 | 790 | 19 | 60 | 128 | 790 | 20 | 75 | .16 |
| 70 | 146 | 785 | 24 | 86 | 134 | 750 | 26 | 100 | .12 |

REACTION PRODUCT OF BETA NAPHTHOL, FORMALDEHYDE AND N, N' DIPHENYL P-PHENYLENE DIAMINE

| 35/285 | 105 | 835 | 16 | 49 | 106 | 800 | 18 | 62 | .07 |
| 50 | 117 | 795 | 20 | 68 | 120 | 770 | 22 | 80 | .17 |
| 70 | 150 | 790 | 25 | 90 | 116 | 720 | 28 | 105 | .19 |

These data demonstrate the excellent characteristics of the products of the invention.

Although only the preferred forms of the invention have been described in detail, it will be apparent to those skilled in the art that various modifications may be made therein without departing from the spirit of the invention or the scope of the appended claims, in which it is intended to cover, by suitable expression in the appended claims, all features of patentable novelty residing in the invention.

What I claim is:

1. The method of treating rubber which comprises vulcanizing the same in the presence of the product derived by the reaction, in one step, of an aldehyde, a diaryl amine, and a phenolic compound.

2. The method of treating rubber which comprises vulcanizing the same in the presence of the product derived by the reaction, in one step, of formaldehyde, beta naphthol, and phenyl beta naphthylamine.

3. The method of treating rubber which comprises vulcanizing the same in the presence of the product derived by the reaction, in one step, of formaldehyde, beta naphthol, and N, N' diphenyl p-phenylene diamine.

4. The method of treating rubber which comprises incorporating therein the product derived by the reaction, in one step and in the presence of an acidic catalyst, of an aldehyde, a diaryl amine, and a phenolic compound.

5. The method of treating rubber which comprises vulcanizing the same in the presence of the product derived by the reaction, in one step and in the presence of hydrochloric acid, of an aldehyde, a diaryl amine, and a phenolic compound.

6. The method of treating rubber which comprises vulcanizing the same in the presence of the product derived by the reaction, in one step and in the presence of hydrochloric acid, of formaldehyde, beta naphthol and phenyl beta naphthylamine.

7. The method of treating rubber which comprises vulcanizing the same in the presence of the product derived by the reaction, in one step and in the presence of hydrochloric acid, of formaldehyde, beta naphthol, and N, N' diphenyl p-phenylene diamine.

8. A rubber product which has been vulcanized in the presence of the product derived by the reaction, in one step, of formaldehyde, beta naphthol, and phenyl beta naphthylamine.

9. A rubber product which has been vulcanized in the presence of the product derived by the reaction, in one step, of formaldehyde, beta naphthol, and N, N' diphenyl p-phenylene diamine.

10. A rubber product which has been vulcanized in the presence of the product derived by the reaction, in one step and in the presence of an acidic catalyst, of an aldehyde, a diaryl amine and a phenolic compound.

11. A rubber product which has been vulcanized in the presence of the product derived by the reaction, in one step and in the presence of hydrochloric acid, of formaldehyde, beta naphthol and phenyl beta naphthylamine.

12. A rubber product which has been vulcanized in the presence of the product derived by the reaction, in one step and in the presence of hydrochloric acid, of formaldehyde, beta naphthol and N, N' diphenyl p-phenylene diamine.

ALBERT M. CLIFFORD.